(12) United States Patent
Lemaistre et al.

(10) Patent No.: US 7,377,766 B2
(45) Date of Patent: May 27, 2008

(54) MOLDING DEVICE FOR THE PRODUCTION OF CONTAINERS IN THERMOPLASTIC MATERIAL

(75) Inventors: Eric Lemaistre, Octeville sur Mer (FR); Regis Leblond, Octeville sur Mer (FR)

(73) Assignee: Sidel, Octeville-Sur-Mer (FR)

( * ) Notice: Subject to any disclaimer, the term of this patent is extended or adjusted under 35 U.S.C. 154(b) by 325 days.

(21) Appl. No.: 10/560,993

(22) PCT Filed: Jun. 11, 2004

(86) PCT No.: PCT/FR2004/001475

§ 371 (c)(1),
(2), (4) Date: Feb. 1, 2006

(87) PCT Pub. No.: WO2005/002820

PCT Pub. Date: Jan. 13, 2005

(65) Prior Publication Data

US 2007/0026098 A1    Feb. 1, 2007

(30) Foreign Application Priority Data

Jun. 19, 2003    (FR)    ................................. 03 07390

(51) Int. Cl.
*B29C 49/56*    (2006.01)

(52) U.S. Cl. ...................................... 425/540; 425/541
(58) Field of Classification Search ................ 425/540, 425/541
See application file for complete search history.

(56) References Cited

U.S. PATENT DOCUMENTS

| 3,825,396 | A | 7/1974 | Kontz | |
| 6,918,754 | B2* | 7/2005 | Albrecht | 425/529 |
| 2006/0275525 | A1* | 12/2006 | Lemaistre et al. | 425/541 |
| 2007/0190202 | A1* | 8/2007 | Mie et al. | 425/541 |

FOREIGN PATENT DOCUMENTS

FR        2 646 802 A    11/1990

* cited by examiner

*Primary Examiner*—Robert B. Davis
(74) *Attorney, Agent, or Firm*—Sughrue Mion, PLLC

(57) ABSTRACT

A moulding device for the production of containers in thermoplastic material, by blowing or blow-drawing, including a mould with two mould halves mutually mobile and provided with a locking device with two lock elements extending over the total height of the respective mould halves and provided with a number of projecting fingers in catches spaced at intervals, one lock element being fixed on one mould half and the other lock element sliding on the other mould half under the action of an actuator device.

12 Claims, 6 Drawing Sheets

MOLDING DEVICE FOR THE PRODUCTION OF CONTAINERS IN THERMOPLASTIC MATERIAL

FIELD OF THE INVENTION

The present invention relates in general to the field of molding devices for blow-molding or stretch-blow-molding containers from heated thermoplastic preforms.

More specifically, the invention relates to improvements made to those of these devices that comprise at least one mold comprising at least two half-molds that can be moved with respect to each other between an open position in which they are parted from one another and a closed position in which they are firmly pressed against one another via collaborating respective bearing faces defining a parting line, locking means being provided to lock the two half-molds in the closed position, which locking means comprising on at least one side of the mold, a first lock element in the form of a hook secured fixedly to the first half-mold along the edge of the bearing face thereof, a second lock element in the form of a hook inverted with respect to the previous one and mounted such that it can move on the second half-mold, and actuating means functionally associated with said second lock element in such a way as to move the latter transversely between a locked position in which it is engaged with the first lock element to lock the two half-molds in the closed position and an unlocked position in which it is disengaged from the first lock element to release the two half-molds that can then be parted from one another.

DESCRIPTION OF THE PRIOR ART

Document FR-A-2 646 802 discloses means for locking two half-molds in the closed position which means comprise a plurality of coupling fingers supported one above the other, coaxially, by a first half-mold and able to be moved parallel to the axis of the mold to engage in a plurality of respective accommodating slots supported by the second half-mold.

Such locking means are satisfactory and are currently in commonplace use in molding devices of the "hinged" mold type.

However, these locking means do have several significant disadvantages.

One disadvantage lies in the fact that the fingers and accommodating slots are supported in cantilever fashion by the first and second half-molds respectively. As the blowing pressure (for example typically of the order of $40 \times 10^5$ Pa) is applied, the supports of these fingers and accommodating slots, which project radially, are subjected to a force substantially tangential to the periphery of the mold. To prevent them from deforming or pulling out, these supports need to be solidly formed, and this increases the weight of the half-molds and also their cost.

Another disadvantage lies in the cantilevered structure of each finger, the base of which is set into a radially projecting support secured to one half-mold whereas, in the locked position, the free end of the finger is held in a corresponding accommodating slot of a radially projecting support secured to the other half-mold. Under the blowing force, each finger is subjected to a bending/shear stress which, once again, entails that each finger be solidly formed, making it heavy and expensive.

All these requirements lead to locking means that project appreciably from the periphery of the mold whereas, in installations comprising a great many molds and operating at high speed (rotary molding devices of the carousel type), the space available is very restricted. Furthermore, these locking means are heavy and increase the inertia of the half-molds, something which is detrimental to installations operating at high speed.

Finally, it must be emphasized that the method of locking/unlocking through the axial movement of a plurality of superposed ("in line") fingers entails relatively long travels so that the portion of each finger engaged in its corresponding slot is long enough and affords appropriate mechanical strength: it is therefore possible to provide only a restricted number of fingers and slots, spaced axially apart by an appreciable distance. This then finally results in a non-uniform distribution of the forces over the height of the mold.

There is therefore a remaining need for molds with a simplified, less bulky, less heavy, simpler and less expensive structure, this need being felt all the more keenly as higher production rates are being sought, entailing mechanisms that work more quickly with lower inertia.

SUMMARY OF THE INVENTION

For these reasons, the invention proposes a molding device as mentioned in the preamble which, being arranged in accordance with the invention, is characterized by the following combination of arrangements:
- the locking means comprise two lock elements mounted respectively on the two half-molds along the edges of the respective bearing faces and extending substantially over the entire height of said half-molds,
- each lock element comprises a multiplicity of hook-shaped projecting fingers distributed over the entire height of the lock element and which, on one lock element face away front the bearing face of the corresponding half-mold and, on the other lock element face toward the bearing face of the corresponding half-mold, said fingers of each lock element being substantially parallel and separated from one another by spacings the individual heights of which are slightly greater than the individual heights of the fingers,
- one of the lock elements being mounted fixedly on the corresponding half-mold and the other lock element being mounted, on the other half-mold, such that it can move so that it can be slid parallel to the axis of the mold,
- and actuating means functionally associated with said moving lock element in order to move the latter between two positions, namely:
    - a first position or unlocked position in which the fingers of the moving lock element are positioned respectively level with the spacings between the fingers of the fixed lock element, in which position the two half-molds are not locked together, and
    - a second position or locked position in which, with the two half-molds pressed firmly together in the closed position, the moving lock element is moved parallel to the axis of the mold so that its fingers engage respectively with the fingers of the fixed lock element, in which position the two half-molds are locked together in their closed position.

In order to obtain a uniform distribution of the catching force over the entire height of the mold, it is desirable for the number of fingers to be as high as possible in relation to the mechanical strength of said fingers, whereby the height of the spacings between the fingers and therefore the travel of the moving lock element between its locked and unlocked positions are as low as possible, which allows for more rapid closure than can be obtained with the conventional mechanisms when the blowing device is a rotary one.

In one practical embodiment, the moving lock element is supported, on the corresponding half-mold, by a guide member substantially parallel to the axis of the mold, on which member said lock element is slidably mounted. It is then advantageous for the guide member to be a rod secured to the half-mold, on which rod the moving lock element is slidably mounted, but prevented from rotating.

For preference, the actuating means for actuating the moving lock element comprise:

a return spring able to return said lock element to its aforesaid first position, and a positive actuating member secured to said moving lock element and able to act positively thereon in order to move it, against the return force of the spring, toward its second position.

One simple solution then consists in contriving for the positive actuating member to be able to be controlled, when the two half-molds are in the closed position, by the other half-mold.

In practical terms, many embodiment variants may be anticipated: the fixed lock element may form an integral part of the corresponding half-mold or alternatively may be produced in the form of a part secured fixedly to the corresponding half-mold; likewise, the guide member that guides the moving lock element may be supported directly by the corresponding half-mold, or alternatively may be fixed to an intermediate plate, itself fixed to the half-mold.

In an embodiment which is very commonplace in practice, the arrangements according to the invention find an application in molds of the hinged type with the two half-molds articulated to one another in terms of rotation on a shaft substantially parallel to one side of the parting line, said locking means then being provided on the opposite side of said shaft about which the two half-molds rotate relative to one another.

It is also commonplace for each half-mold to comprise a shell holder to which there is internally fixed a shell equipped with a molding half-cavity the parting line being defined by the two shells pressed together when the mold is in the closed position, in which case, according to the invention, the locking means are supported by the two shell-holders.

By virtue of the provisions according to the invention, a blow-molding or stretch-blow-molding mold is produced in which locking is obtained by a single moving part with a relatively short travel; this travel is linear and parallel to the axis of the mold; finally, the moving part, which is greatly notched in many places to define the locking fingers, has a low mass and therefore a low inertia.

The result of this is that no angular movement of the locking parts is superposed on the rotational movement of the half-molds during closure or opening and these half-molds are subjected to no parasitic acceleration as they rotate. The vertical movement component of the moving lock element has no appreciable influence over the behavior of the corresponding half-mold. This then finally yields more uniform movements of the half-molds and, above all, shorter locking/unlocking times that provide an effective contribution to increasing the operating rate of the molding device; indeed, for the same rotational speed, if the times needed for locking/unlocking are shorter, the time available for blowing can be increased.

BRIEF DESCRIPTION OF THE DRAWINGS

The invention will be better understood from reading the detailed description which follows of certain preferred embodiments given solely by way of nonlimiting examples. In this description, reference is made to the attached drawings in which.

DETAILED DESCRIPTION OF THE INVENTION

The arrangements according to the invention are improvements made to molding devices for the blow-molding or stretch-blow-molding of containers, such as bottles, from heated thermoplastic (for example PET) preforms. Such a molding device comprises at least one mold comprising at least two half-molds (and possibly a third part that forms an axially movable mold bottom) which can be moved relative to one another between an open position in which they are parted from one another and a closed position in which they are pressed firmly against one another by collaborating respective faces defining a parting line, locking means being provided to lock the two half-molds in the closed position and prevent them from parting or gaping when the blowing fluid is introduced under very high pressure (for example typically of the order of $40 \times 10^5$ Pa).

Commonly, such molding devices may comprise a multiplicity of molds and may therefore be arranged in the form of a rotary device or carousel with the molds arranged at the periphery, the various functions of opening/closing, locking/unlocking, etc. the molds possibly being controlled in sequence as the carousel rotates by cam follower rollers borne by the molds and collaborating with guide cams mounted fixedly on the outside of the rotary part.

Although the arrangements according to the invention can be applied to any type of mold, they are particularly applicable to molds equipped with two half-molds that rotate one with respect to the other, or to hinged molds, which are currently in very widespread use, and it is therefore in the context of a hinged mold that the arrangements of the invention will be set out in detail, without the protection being restricted to this one type of mold.

Figure 1:
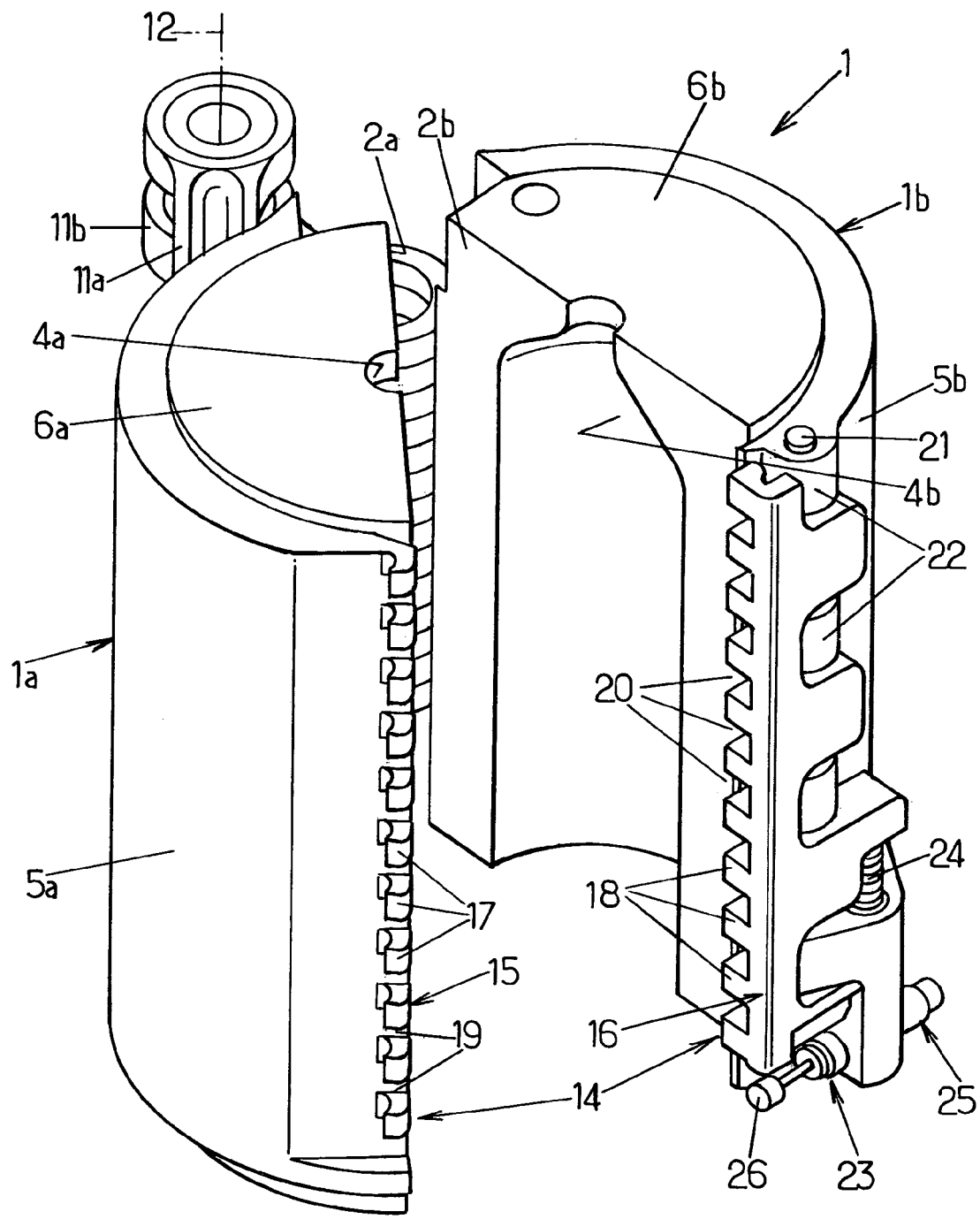
FIGS. 1 to 4 are simplified perspective views of a mold of the hinged type arranged according to the invention, shown in four functionally different positions respectively.
Figure 3:
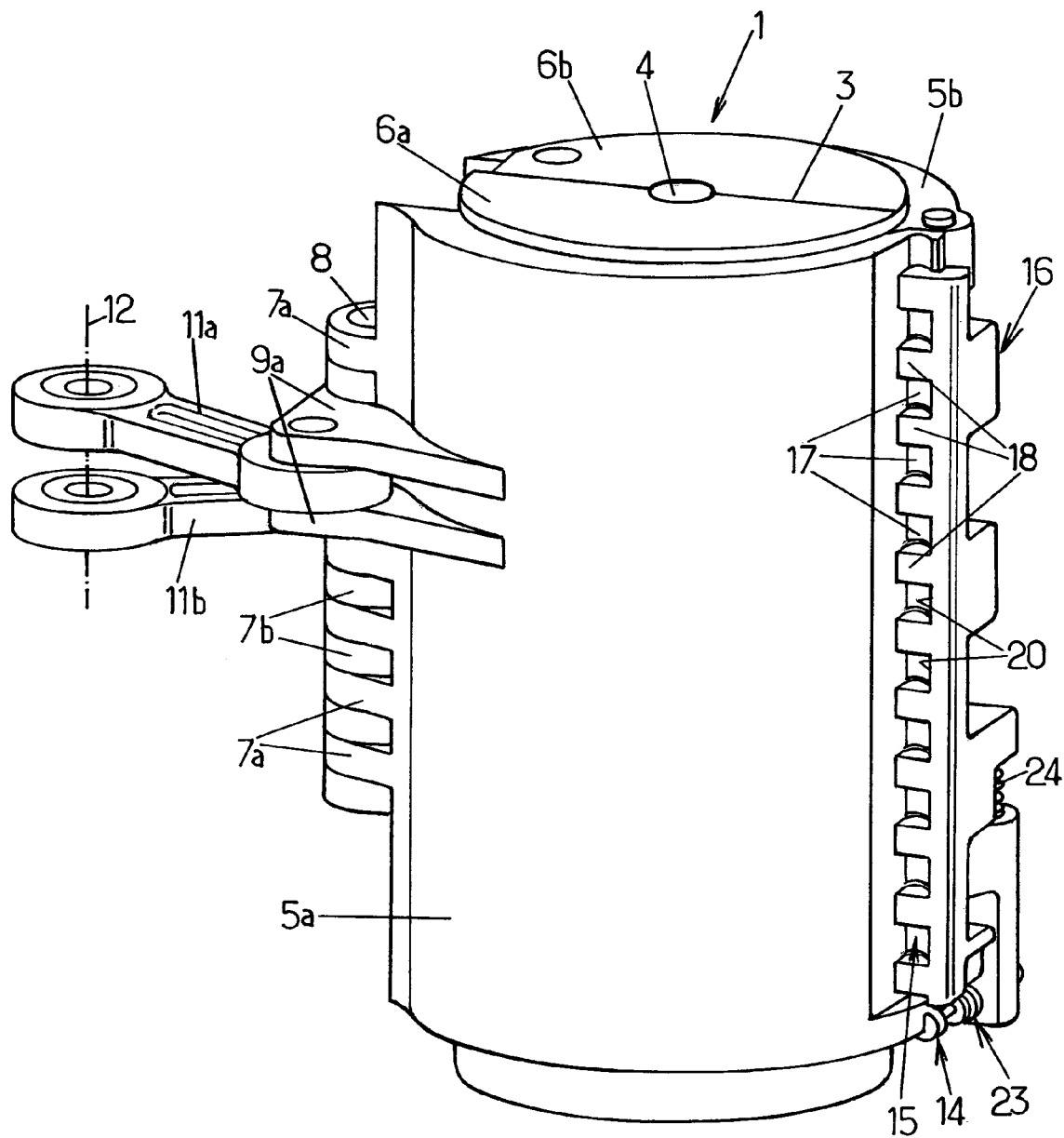
Figure 4:
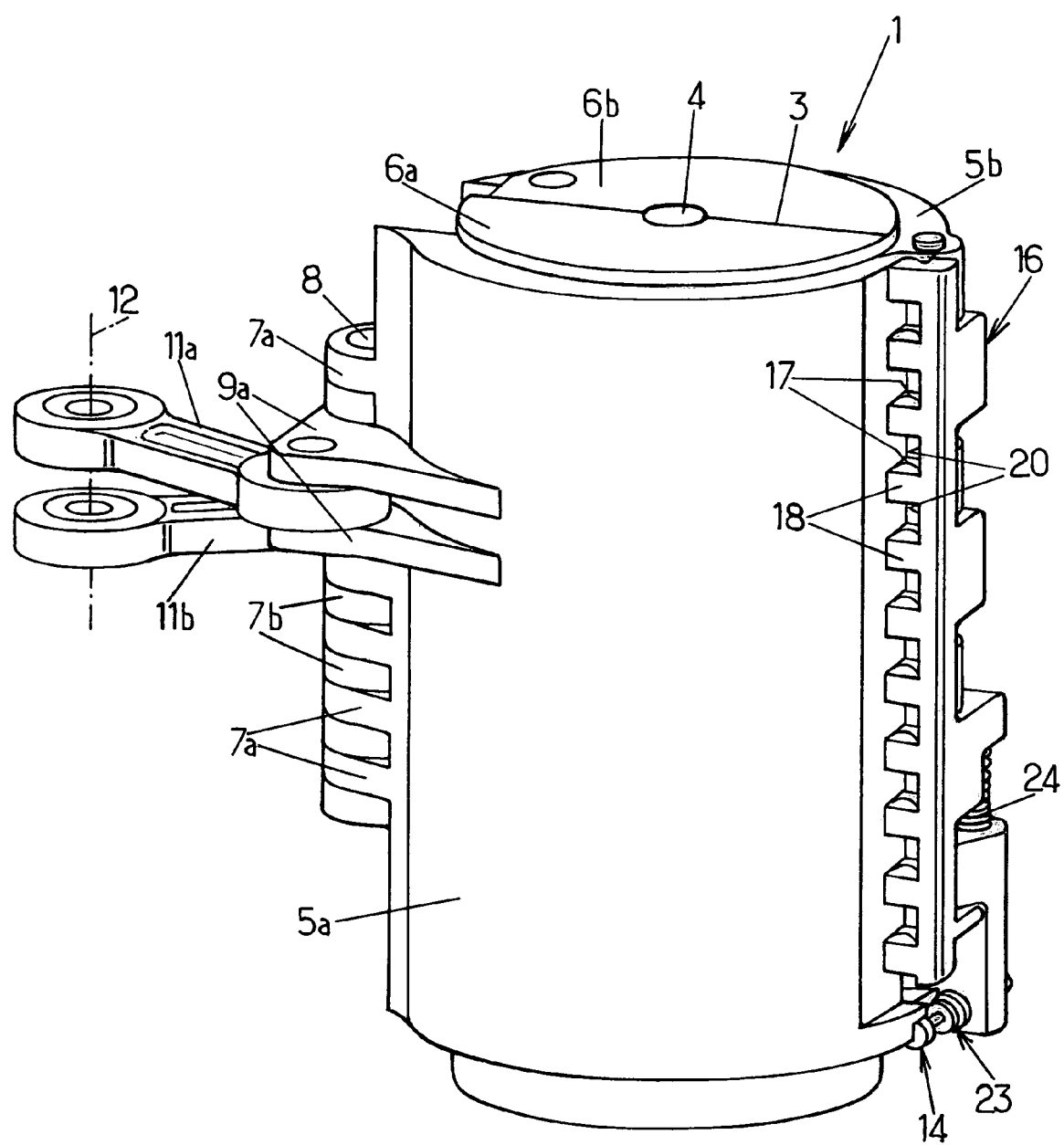

FIG. 1 illustrates, in simplified form, in perspective, the general arrangement of a hinged mold, denoted in its entirety by the reference 1, comprising two half-molds 1a and 1b (it also being possible for an axially movable bottom—not shown—to be provided at the base of the mold). The two half-molds respectively have two collaborating faces or bearing faces 2a, 2b which, in the closed position, define a parting line 3 (FIGS. 3, 4). The collaborating faces are hollowed out with, respectively, two half-cavities 4a, 4b which, when put together, define the molding volume 4 that has the external shape of the container that is to be obtained, or at least a major part of this shape, with the exclusion of its bottom.

In the example more particularly illustrated in FIG. 1, each half-mold 1a, 1b has a composite structure and comprises an external framework or shell-holder 5a, 5b and an interior molding part or shell 6a, 6b which is fixed removably into the respective shell holder and comprises the aforesaid respective half-cavity 4a, 4b.

Figure 5:
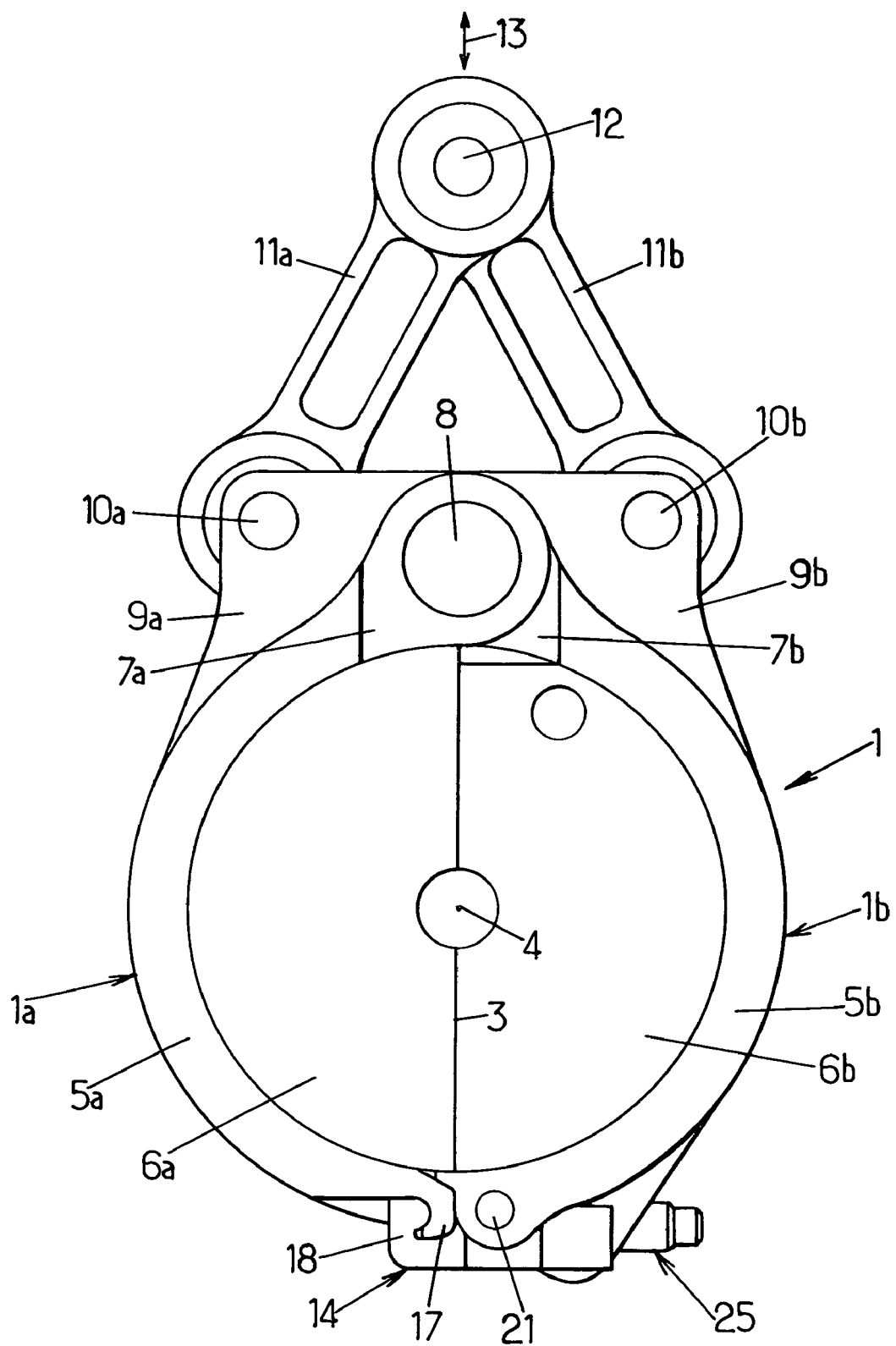
FIG. 5 is a simplified view from above of the mold shown in FIG. 4, in the closed and locked position.

As can best be seen in FIGS. 3, 4 and 5, the half-molds 1a, 1b (in this instance the shell-holders 5a, 5b) comprise, on one side, respective protruding cheeks 7a, 7b which are interleaved with one another in a superposed fashion and have passing through them a shaft 8 arranged in the continuation of the parting line.

Furthermore, two projecting lugs 9a, 9b respectively support in rotation, via-spindles 10a, 10b distant from one another on each side of the shaft 8, the ends of two actuating link rods 11a, 11b the other two respective ends of which are connected with the ability to rotate freely on a spindle 12 which can be moved in a linear fashion (arrow 13) toward the spindle 8 or in the opposite direction, by drive means (not shown).

On the other side of the parting line 3 and on the opposite side to the shaft 8 there are locking means 14 intended to keep the two half-molds 1a, 1b in the closed position as the blowing pressure is applied.

The locking means 14 comprise:
a first lock element 15 which is fixedly secured to the first half-mold 1a (the one on the left in FIG. 1) which extends substantially along the edge of the bearing face 2a thereof, and
a second lock element 16 which is secured such that it can move to the second half-mold 1b (the one on the tight in FIG. 1) and which extends substantially along the edge of the bearing face 2b thereof,
the two lock elements 15, 16 extending substantially over the entire height of said half-molds 1a, 1b.

Each lock element 15, 16 comprises a multiplicity of respective hook-shaped projecting fingers 17, 18 distributed over the entire height of the lock element. The fingers 17 of the first lock element 15 are parallel and face away from the bearing face 2a of the corresponding half-mold 1a and the fingers 18 of the second lock element 16 are parallel and face toward the bearing face 2b of the corresponding half-mold 1b. The fingers 17, 18 of each lock element 15, 16 have in practice approximately the same height and are separated by spacings 19, 20 respectively, the individual heights of which are slightly greater than the individual heights of the fingers.

The second lock element 16 is mounted on the half-mold 1a such that it can slide vertically, that is to say parallel to the axis of the mold. For this purpose, one simple embodiment is, as illustrated, for the half-mold 1b to be equipped with a guide member substantially parallel to the axis of the mold and arranged along the edge of the bearing face 2b, it advantageously being possible for this guide member to consist of a rod 21 held in devises 22 projecting from the external face of the half-mold 1b and on which rod the lock element 16 is mounted such that it can slide but prevented from rotating.

Actuating means 23 are functionally associated with the lock element 16 to move it between two positions, namely:
a first position or unlocked position (FIGS. 1, 2 and 3) in which the fingers 18 of the moving lock element 16 are positioned respectively level with the spacings 19 separating the fingers 17 of the first lock element 15 and the spacings 20 between the fingers 18 are situated respectively level with the fingers 17, in other words a position in which the two lock elements are vertically offset from one another such that their respective fingers 17, 18 do not interfere with each other, and
a second position or locked position (FIG. 4) in which the two half-molds 1a, 1b are pressed firmly together (closed) and the moving lock element 16 is moved vertically, parallel to the axis of the mold, on the rod 21 so that its fingers 18 fit in behind the fingers 17 of the fixed lock element and engage respectively therewith, so that it becomes impossible to open the mold.

Figure 2:
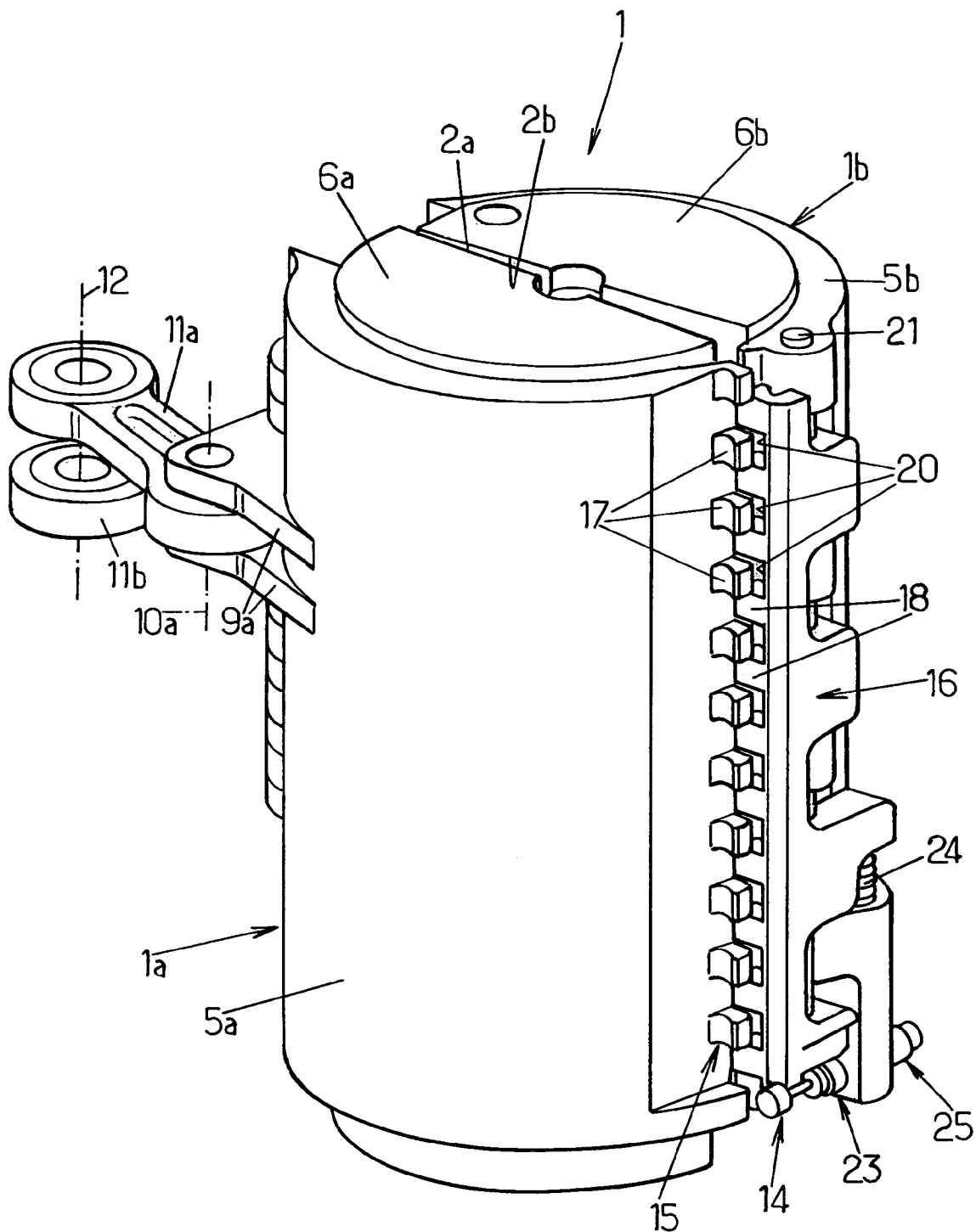

FIGS. 1 to 4 show four successive positions in the closing of the mold:
in FIG. 1, the mold 1 is open, the two half-molds 1a, 1b are widely parted from one another, particularly with a view to loading a preform;
in FIG. 2, the mold 1 is partially closed, the two half-molds 1a, 1b being brought closer together and the respective fingers 17, 18 being offered up to face the respective opposing spacings 19, 20;
in FIG. 3, the mold 1 is in the closed position, the two half-molds 1a, 1b being pressed firmly together via their respective bearing faces 2a, 2b defining the parting line 3, the fingers 17, 18 being imbricated in one another;
and finally, in FIG. 4, the moving lock element 16 has been moved (in this example raised) along the rod 21 so that the fingers 17, 18 are hooked together, the mold 1 then being closed and locked.

In order for the locking force to be distributed approximately uniformly over the entire height of the mold, it is necessary for fingers 17, 18 to be uniformly distributed over this entire height, defining between them spacings that are as short as possible. It is therefore desirable for the number of fingers to be determined as a compromise, that is to say to be as high as possible in conjunction with their having sufficient individual mechanical strength to allow them, without breaking or deforming, to withstand the force individually applied to them. One advantageous result of this arrangement is that the travel of the moving lock element 16 is short, leading to brief locking/unlocking times. To give a concrete example, the mold illustrated by way of example in FIGS. 1 to 4, designed for molding 1.5-liter bottles and having a height of approximately 35 cm, is equipped with about ten pairs of fingers 17, 18.

The actuating means 23 for actuating the moving lock element 16 may, in a simple way, comprise:
a return spring 24, interposed between the half-mold 1b and the lock element 16, to return the latter to its aforesaid first position or unlocked position, and
a positive actuating member secured to the lock element 16 and able to act positively thereon in order to move it, against the return force of the spring 24, toward its second position.

By virtue of this arrangement it can be guaranteed that even unwanted mold closure will always occur with the fingers 17, 18 offset from one another.

When the mold forms part of a rotary molding device of the carousel type, the positive actuating member may call upon a simple technical solution functionally associated with mold closure. For this purpose, as shown in FIGS. 1 to 4, one of the half-molds, for example the one 1b on the right, is made to support a movement transmission device 25 comprising a moving rod 26 projecting beyond the bearing face 2b and able to be contacted and pushed back by the other half-mold 1a as the mold is closed. The device 25 incorporates an appropriate mechanical means (for example inclined surfaces controlled by the rod 26) or preferably pneumatic means (the rod 26 controls a pneumatic piston) acting on a thrust rod (inside the spring 24 and not visible) able to raise the lock element 16.

The way in which the locking means 14 are embodied may give rise to many variants. In particular, in the example illustrated in FIGS. 1 to 5, the two lock elements 15, 16 form an integral part of the two respective half-molds 1a, 1b, that is to say that the projecting fingers 17 of the first lock element 15 form an integral part of the first half-mold 1a (for example are cast with this half-mold or with the shell-holder 5a in the example illustrated), while the devises 22 supporting the guide rod 21 of the second lock element 16 form an integral part of the second half-mold 1b (or of the shell-holder 5b in the example illustrated).

Figure 6:
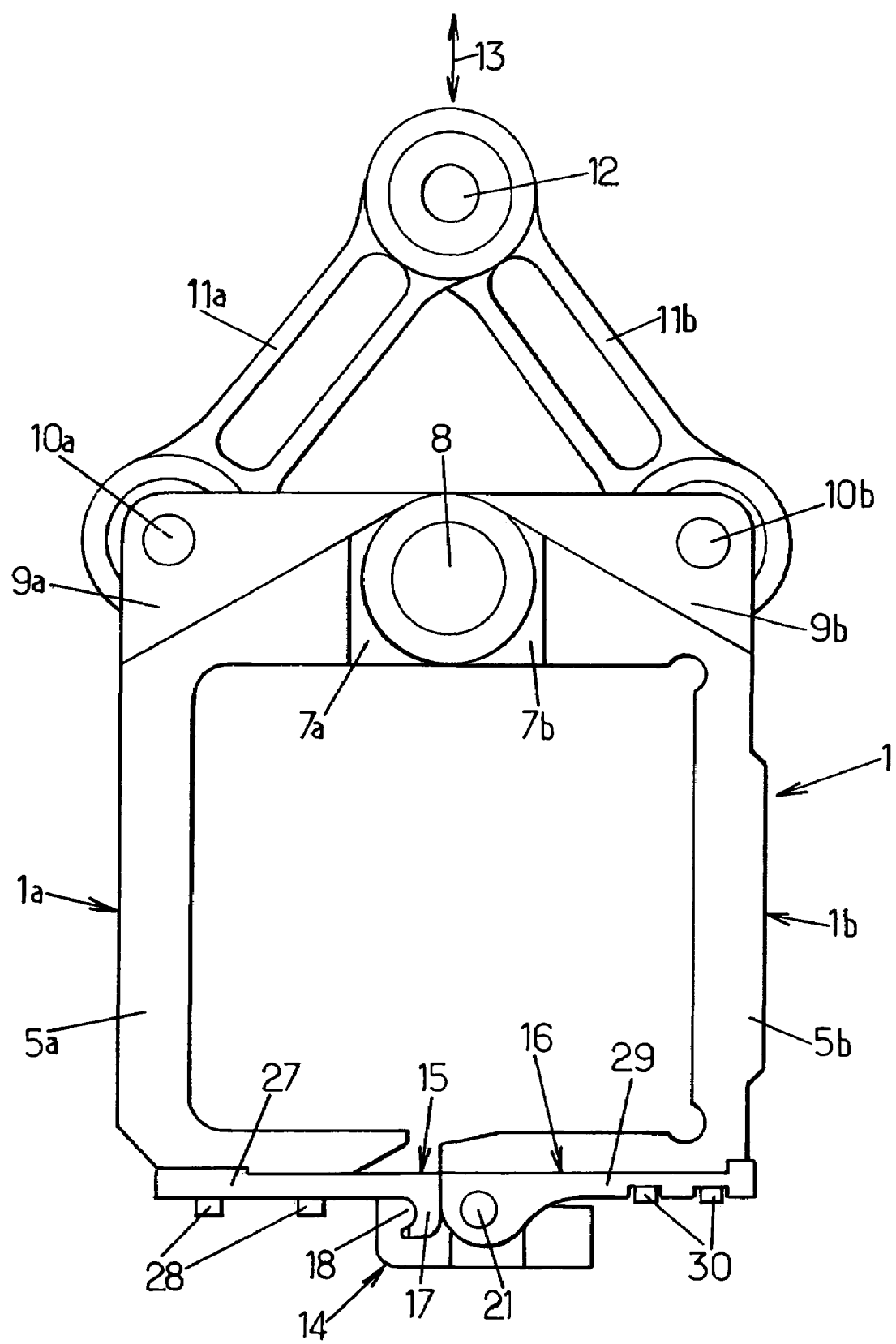
FIG. 6 is a simplified view from above showing an embodiment variant of the locking means according to the invention.

However, it is possible to envisage forming the locking means in the form of separate elements attached to the half-molds, as illustrated in FIG. 6 (in which the mold has a different, quadrilateral, shape, only the shell-holders 5a, 5b being drawn, and the shells being omitted). As visible in this FIG. 6, the first lock element 15 is produced in the form of a plate 27 which is provided with the fingers 17 along one of its edges; the plate 27 is fixed, for example by bolting at 28, to the corresponding shell-holder 5a. In the same way, the shaft 21 that acts as a guide for the second lock element 16 may be supported by a plate 29 attached, for example by bolting at 30, to the second shell-holder 5b. Such an arrangement of the first and/or second lock elements 15, 16 in the form of attached parts may allow the manufacture of the half-molds or shell-holders to be simplified and/or may allow the half-molds or shell-holders and the parts incorporating the hook-shaped fingers 17, 18 to be made of different metals (for example aluminum casting and steel, respectively).

What is claimed is:

1. A molding device for blow-molding or stretch-blow-molding containers from heated thermoplastic preforms, said device comprising at least one mold comprising at least two half-molds that can be moved with respect to each other between an open position in which they are parted from one another and a closed position in which they are firmly pressed against one another via collaborating respective bearing faces defining a parting line, locking means being provided to lock the two half-molds in the closed position, wherein:
    the locking means comprise two lock elements mounted respectively on the two half-molds along the edges of the respective bearing faces and extending substantially over the entire height of said half-molds,
    each lock element comprises a multiplicity of hook-shaped projecting fingers distributed over the entire height of the lock element and which, on one lock element face away from the bearing face of the corresponding half-mold and, on the other lock element face toward the bearing face of the corresponding half-mold, said fingers of each lock element being substantially parallel and separated from one another by spacings the individual heights of which are slightly greater than the individual heights of the fingers,
    one of the lock elements being mounted fixedly on the corresponding half-mold and the other lock element being mounted, on the other half-mold, such that it can move so that it can be slid parallel to the axis of the mold,
    and actuating means functionally associated with said moving lock element in order to move the latter between two positions, namely:
    a first position or unlocked position in which the fingers of the moving lock element are positioned respectively level with the spacings between the fingers of the fixed lock element, in which position the two half-molds are not locked together, and
    a second position or locked position in which, with the two half-molds pressed firmly together in the closed position, the moving lock element is moved parallel to the axis of the mold so that its fingers engage respectively with the fingers of the fixed lock element, in which position the two half-molds are locked together in their closed position.

2. The molding device as claimed in claim 1, wherein the number of fingers is as high as possible in relation to the mechanical strength of said fingers, whereby the height of the spacings between the fingers and therefore the travel of the moving lock element between its locked and unlocked positions are as low as possible.

3. The molding device as claimed in claim 1, wherein the moving lock element is supported, on the corresponding half-mold, by a guide member substantially parallel to the axis of the mold, on which member said lock element is slidably mounted.

4. The molding device as claimed in claim 3, wherein the guide member is a rod secured to the half-mold, on which rod the moving lock element is slidably mounted, but prevented from rotating.

5. The molding device as claimed in claim 1, wherein the actuating means for actuating the moving lock element comprise:
    a return spring able to return said lock element to its aforesaid first position, and
    a positive actuating member secured to said moving lock element and able to act positively thereon in order to move it, against the return force of the spring, toward its second position.

6. The molding device as claimed in claim 5, wherein the positive actuating member is able to be controlled, when the two half-molds are in the closed position, by the other half-mold.

7. The molding device as claimed in claim 1, wherein the fixed lock element forms an integral part of the half-mold.

8. The molding device as claimed in claim 1, wherein the fixed lock element is produced in the form of a part secured fixedly to the corresponding half-mold.

9. The molding device as claimed in claim 3, wherein the guide member that guides the moving lock element is supported directly by the corresponding half-mold.

10. The molding device as claimed in claim 3, wherein the guide member that guides the moving lock element is fixed to an intermediate plate, itself fixed to the half-mold.

11. The molding device as claimed in claim 1, wherein the mold is of the hinged type with the two half-molds articulated to one another in terms of rotation on a shaft substantially parallel to one side of the parting line and wherein said locking means (14) are provided on the opposite side of said shaft about which the two half-molds rotate relative to one another.

12. The molding device as claimed in claim 1, in which each half-mold comprises a shell holder to which there is internally fixed a shell equipped with a molding half-cavity the parting line being defined by the two shells pressed together when the mold is in the closed position, wherein the locking means are supported by the two shell-holders.

* * * * *